(12) United States Patent
Kelly et al.

(10) Patent No.: US 6,281,321 B1
(45) Date of Patent: Aug. 28, 2001

(54) COATING COMPOSITIONS

(75) Inventors: Sarah Anne Mackie Kelly, Gateshead; Christopher Robin Birkert, Tyne & Wear; Adrian Ferguson Andrews, Northumberland, all of (GB)

(73) Assignee: Akzo Nobel N.V. (NL)

( * ) Notice: Subject to any disclaimer, the term of this patent is extended or adjusted under 35 U.S.C. 154(b) by 0 days.

(21) Appl. No.: 09/322,750

(22) Filed: May 28, 1999

Related U.S. Application Data

(63) Continuation of application No. PCT/GB97/03304, filed on Nov. 27, 1997.

(51) Int. Cl.$^7$ .................................................. C08G 77/06
(52) U.S. Cl. ................... 528/17; 528/14; 528/18; 528/19; 528/26; 528/28; 528/38; 528/39; 106/287.11; 106/287.15; 427/387
(58) Field of Search .................. 528/26, 28, 38, 528/39, 17, 18, 19, 14; 106/287.11, 287.15; 427/387

(56) References Cited

U.S. PATENT DOCUMENTS

| | | | |
|---|---|---|---|
| 3,776,881 | 12/1973 | Lerner et al. ........................ 260/37 |
| 3,917,648 | 11/1975 | McLeod ............................. 260/32.8 |
| 4,016,333 | 4/1977 | Gaske et al. ........................ 428/447 |
| 4,064,286 | 12/1977 | Hahn ................................... 427/44 |
| 4,113,665 | 9/1978 | Law et al. ............................ 260/37 |
| 4,250,074 | 2/1981 | Foscante et al. .................... 260/32.8 |
| 4,429,082 | * 1/1984 | Lee et al. ............................ 525/426 |
| 4,603,086 | * 7/1986 | Fujii et al. .......................... 528/447 |
| 4,606,933 | 8/1986 | Griswold et al. ................... 427/54.1 |
| 4,678,835 | 7/1987 | Chang et al. ....................... 525/100 |
| 4,698,406 | 10/1987 | Lo et al. ............................... 528/12 |
| 4,762,887 | * 8/1988 | Griswold et al. .................... 522/99 |
| 5,275,645 | 1/1994 | Ternoir et al. ......................... 106/2 |
| 5,292,799 | 3/1994 | Naito et al. .......................... 524/783 |
| 5,426,142 | 6/1995 | Rosano et al. ....................... 524/156 |
| 5,648,173 | * 7/1997 | Blizzard ............................... 428/446 |
| 5,739,192 | * 4/1998 | Blizzard et al. ...................... 524/379 |
| 5,840,428 | * 11/1998 | Blizzard et al. ...................... 428/412 |
| 6,011,114 | * 1/2000 | Liles et al. ........................... 524/837 |

FOREIGN PATENT DOCUMENTS

| | | | |
|---|---|---|---|
| 0 449 413 | 10/1991 | (EP) | ................................. C08F/2/38 |
| 0 588 508 | 3/1994 | (EP) | ................................. C09D/4/00 |
| 0 620 255 | 10/1994 | (EP) | ................................. C09D/4/00 |
| 0 666 290 | 8/1995 | (EP) | ................................. C09D/4/00 |
| 0 725 088 | 8/1996 | (EP) | ................................. C08F/8/42 |
| 0 730 015 | 9/1996 | (EP) | ............................. C09D/183/10 |
| 96/16109 | 5/1996 | (WO) | ............................. C08G/77/04 |

OTHER PUBLICATIONS

JP 07070509, Thermosetting resin compositions for top coats, Jun. 17, 1994, 3 pages, chemical abstract.
JP 01207363, Moisture–curable siloxane coating compositions for buildings, Feb. 15, 1988, pages, chemical abstract.

* cited by examiner

*Primary Examiner*—Margaret G. Moore
(74) *Attorney, Agent, or Firm*—Joan M. McGillycuddy

(57) ABSTRACT

A curable coating composition has a binder comprising a compound or polymer (A) containing at least one primary or secondary amine group, a compound or polymer (B) containing at least one ethylenically unsaturated double bond activated by an adjacent electron-withdrawing group, and a polymer (C) containing at least two silicon-bonded alkoxy groups. Either (A) or (B) contains at least one silicon-bonded alkoxy group in its molecule. The coating is capable of curing at ambient temperature and humidity both by hydrolysis and condensation of the Si—O—C bonds of the polyorganosiloxane (C) and of the aminoalkyl silane (A) and by Michael-type addition reaction of the amine group of the aminoalkyl silane (A) with the activated ethylenically unsaturated double bonds of (B).

26 Claims, No Drawings

COATING COMPOSITIONS

This is a continuation of International Application No. PCT/GB97/03304, with an international filing date of Nov. 27, 1997, designating the United States of America, expressly abandoned after the filing and acceptance of the present application. This application claims priority of Great Britain Application No. 9624881.0, filed Nov. 29, 1996.

FIELD OF THE INVENTION

This invention relates to a coating composition capable of being cured at ambient temperature and useful as a protective coating for steel structures and/or as a weather-resistant exterior coating.

BACKGROUND OF THE INVENTION

Curable coating compositions based on a silane or siloxane containing at least two alkoxy groups bonded to silicon by Si—O—C bonds are known for example from U.S. Pat. No. 3,917,648, U.S. Pat. No. 4,113,665, U.S. Pat. No. 3,776,881, U.S. Pat. No. 5,275,645 and U.S. Pat. No. 5,292,799.

U.S. Pat. No. 4,250,074 describes the production of coatings of modified epoxy polymers with improved resistance to solvent, acid and base by forming an interpenetrating polymer network (IPN) of a polymerised epoxy resin network intertwined with a polysiloxane network formed by the hydrolytic polycondensation of silane groups. This is achieved by the simultaneous polymerisation, at substantially balanced reaction rates, of a mixture of epoxy resin and silane groups to form the two intertwined networks extending throughout the coating. An amine curing agent forms the epoxy network, and water distributed throughout the mixture causes the hydrolytic polycondensation of the silane groups. A preferred method for preparing the IPN is to react epoxy resin with an aminosilane capable of both hydrolytic polycondensation of the silane moiety and amine addition of the oxirane rings of the epoxy resin.

WO-A-96/16109 describes a fully cured non-interpenetrating network epoxy-modified polysiloxane coating composition prepared by combining water, a non-aromatic epoxide resin having more than one 1,2-epoxy group per molecule with an epoxide equivalent weight in the range of from 100 to about 500, a polysiloxane, an organo-oxysilane, a hardener component comprising a difunctional amine and/or an aminosilane, and a pigment or aggregate component. U.S. Pat. No. 4,678,835 describes a coating composition containing an ungelled reaction product of (i) at least 2 percent by weight of an amine having in a molecule thereof at least one amino hydrogen atom and at least one silicon atom directly bonded to a hydrolysable group, (ii) at least 4 percent by weight of a material containing at least one epoxide group, and (iii) a material selected from vinyl alkoxysilanes, non-functional organosilanes, organosilicates and partial hydrolysis products thereof.

U.S. Pat. No. 4,698,406 describes a curable silicone composition comprising (i) an amine-functional organopolysiloxane and (ii) an acryl-functional organopolysiloxane selected from acryloxy-, methacryloxy or acrylamide-functional organopolysiloxanes.

U.S. Pat. No. 4,429,082 describes an anhydrous ungelled reaction product characterised in having a non-vinyl addition back-bone being essentially acrylyl-free, having a silicon content of up to about 12 percent, and derived from the reaction of (a) a condensation product having at least 2 amine-reactive acrylyl residues per molecule and (b) an amino silane.

EP-A-725088 describes a process for post-reacting polymers having acetoacetate functional groups comprising polymerising a monomer mixture comprising an acetoacetate-functional monomer and a vinyl monomer, and then after polymerisation post-reacting the acetoacetate-functional polymer product with an amino-functional silane.

SUMMARY OF THE INVENTION

A curable coating composition according to the present invention has a binder comprising a compound or polymer (A) containing at least one primary or secondary amine group and a compound or polymer (B) containing at least one ethylenically unsaturated double bond activated by an adjacent electron-withdrawing group. The compound or polymer (B) contains at least two activated ethylenically unsaturated double bonds if the compound or polymer (A) contains only one primary or secondary amine group. The coating composition is characterised in that either (A) or (B) contains at least one silicon-bonded alkoxy group in its molecule and the composition additionally contains a polymer (C) containing at least two silicon-bonded alkoxy groups.

When the coating composition of the invention is coated on a substrate and allowed to cure at ambient (or higher) temperature and humidity (for example 5 to 45° C. and to 90% relative humidity), the binder cures both by Michael-type addition reaction of the amine group of (A) with the activated ethylenically unsaturated double bond of (B) and by hydrolysis and condensation of the Si—O—C bonds of (C) and whichever of (A) and (B) contains a silicon-bonded alkoxy group in its molecule, forming a flexible adherent coating film resistant to heat and weathering. The said component (A) or (B) containing a silicon-bonded alkoxy group as well as either an amine group or an activated double bond can take part in crosslinking reactions with all the components of the binder.

In one preferred coating composition according to the invention the compound or polymer (A) is a silane or siloxane containing at least two alkoxy groups bonded to silicon by Si—O—C bonds and also containing at least one primary or secondary amine group. Such a silane or siloxane (A) can be an aminoalkyl silane containing at least two, preferably three, alkoxy groups bonded to silicon and/or an organopolysiloxane containing both aminoalkyl and Si-bonded alkoxy groups. Most preferably, for finish coatings having high gloss and high weathering resistance, the polymer (C) is a polyorganosiloxane and the silane or siloxane (A) is an aminoalkyl silane containing at least two alkoxy groups bonded to silicon. Such aminoalkyl silanes are commercially available and have good reactivity both in Michael-type reactions and in condensation of alkoxysilyl groups. Aminoalkyl-substituted alkoxy-terminated polydiorganosiloxanes are also effective but are not generally available commercially.

Thus, according to another aspect of the invention a curable coating composition comprises a polyorganosiloxane (C) containing at least two alkoxy groups bonded to silicon and an aminoalkyl silane (A) containing at least one alkoxy group bonded to silicon and is characterised in that the composition additionally contains a compound or polymer (B) containing at least two ethylenically unsaturated double bonds each activated by an adjacent electron-withdrawing group, whereby the coating is capable of curing at ambient temperature and humidity both by hydrolysis and condensation of the Si—O—C bonds of the polyorganosiloxane (C) and of the aminoalkyl silane (A) and by Michael-type addition reaction of the amine group of the aminoalkyl silane (A) with the activated ethylenically unsaturated double bonds of (B).

DETAILED DESCRIPTION OF THE INVENTION

Examples of preferred aminoalkyl silanes are primary amines such as 3-aminopropyl triethoxy silane, 3-aminopropyl trimethoxy silane, 3-aminopropyl methyl dimethoxysilane or 3-aminopropyl methyl diethoxy silane, primary secondary amines such as N-(2-aminoethyl)-3-aminopropyl trimethoxy silane, secondary amines such as N-methyl- or N-phenyl-3-aminopropyl trimethoxy silane, condensed aminoalkyl silanes such as bis(3-aminopropyl) tetramethoxy or tetraethoxy disiloxane $NH_2(CH_2)_3$—Si $(OCH_3)_2$—O—$(CH_3O)_2Si$—$(CH_2)_3NH_2$, polyglycolether-modified aminosilanes such as that sold under the Trademark "Dynasylan 121" and triamino functional propyl trimethoxy silanes such as "Dynasylan TRIAMO" available from Hüls AG. Similar silanes having two or three silicon atoms can be used.

The polymer (C) having at least two Si-bonded alkoxy groups used in the first aspect of the invention is preferably a polyorganosiloxane, as is the polymer (C) used in the second aspect, for example of the formula:

$$R^1\text{----}O\text{---}\underset{\underset{R^2}{|}}{\overset{\overset{R}{|}}{Si}}\text{----}R^3$$
$$n$$

where each of the groups $R^1$ is an alkyl group, preferably having 1 to 6 carbon atoms, each R is an alkyl, aryl or alkoxy group and is preferably an alkyl group having 1 to 6 carbon atoms, or a phenyl group, each $R^2$ is an alkoxy group, preferably having 1 to 6 carbon atoms, a hydrocarbyl group such as an alkyl (preferably having 1 to 6 carbon atoms) or phenyl group or a branching group of the formula:

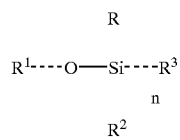

where each $R^4$ is an alkyl, aryl or alkoxy group, preferably having up to 6 carbon atoms, and $R^5$ is a group of the formula —O—$Si(R^4)_3$ where the groups $R^4$ can be the same or different, $R^3$ is an alkoxy, alkyl or aryl group, preferably having up to 6 carbon atoms, and n is a number such that the polysiloxane contains 3–100 silicon atoms, preferably 4 to 25 silicon atoms. The polyorganosiloxane can for example be a polydiorganosiloxane or a polymer having a proportion of diorganosiloxane units, and such polymers may be particularly preferred for high-gloss finish coatings having good resistance to weathering, especially in sunlight. The polyorganosiloxane can alternatively be an oligomeric alkyl silicate containing units of the formula:

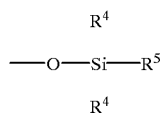

where $R^6$ is alkyl, preferably having 1 to 6 carbon atoms, and branching units such as:

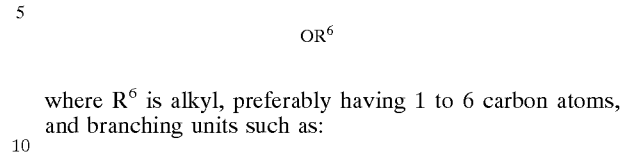

Inclusion of such oligomeric alkyl silicates is particularly preferred in heat-resistant coatings.

The groups $R^1$ are preferably methyl, ethyl and/or butyl groups. The groups R can be the same or different; for example diorganosiloxane units can be dimethylsiloxane units or can be alkyl phenyl, for example methyl phenyl, siloxane units or diphenylsiloxane units; the polyorganosiloxane can be a methyl phenyl polysiloxane containing a selection of such units.

Oligomeric alkyl silicates are available commercially, for example the material sold under the Trademark "Silres MSE 100" having the empirical formula $CH_3Si(O)_{1.1}(OCH_3)_{0.8}$.

The polymer (C) can alternatively be an organic polymer containing alkoxysilicon groups, for example a trimethoxysilyl-functional polybutadiene derivative or an acrylic polymer containing pendent or terminal trialkoxysilyl groups.

The activated ethylenically unsaturated double bond of the compound or polymer (B) is activated by at least one adjacent electron-withdrawing group such as a carboxyl, carbonyl or carbonamide group. Preferably, the compound or polymer (B) contains two such activated double bonds. Most preferably, the ethylenically unsaturated double bonds are present as alpha, beta-ethylenically unsaturated carboxylate ester groups such as acrylate, methacrylate, maleate or fumarate groups. (B) can for example be a compound which is an acrylate or methacrylate ester of a polyol, for example propylene glycol diacrylate or di- or tri-propylene glycol diacrylate, trimethylolpropane triacrylate, trimethylolethane triacrylate, 1,6-hexanediol diacrylate, 1,4-butanediol diacrylate or dimethacrylate and/or pentaerythritol tri- or tetra-acrylate. (B) can alternatively be an oligomer or polymer, for example of molecular weight at least 300 up to 3000 or 5000, containing at least two acrylate or methacrylate groups. Acrylate groups are preferred because they are more reactive in the Michael reaction at ambient temperature than methacrylate groups, and the acrylate or methacrylate groups are preferably present as terminal groups. When using an aminoalkyl trialkoxy silane (A), an acrylate-functional oligomer (B) is particularly preferred for forming coatings with improved flexibility.

One preferred type of polymer (B) is a urethane acrylate. This can be formed for example by the reaction of an isocyanate-tipped prepolymer with a hydroxyalkyl acrylate or methacrylate such as hydroxyethyl acrylate. The isocyanate-tipped prepolymer can for example be formed by reaction of a polyether or polyester polyol with excess of a diisocyanate such as hexamethylene diisocyanate, isophorone diisocyanate, tolylene diisocyanate or methylene bis (phenyl isocyanate). Alternatively, the polymer (B) can be an epoxyacrylate (an acrylate ester derived from an epoxy resin by reaction with acrylic or methacrylic acid), a polyether acrylate, for example propoxylated glycerol triacrylate or polypropylene glycol diacrylate, a polyester acrylate, melamine resin acrylate, a polyamide acrylate, an acrylic polymer having pendent acrylate groups, a silicone acrylate which may or may not contain Si-bonded alkoxy groups, or a polyester oligomer containing maleate or fumarate ester units.

The component (B) can be a bland of different types of acrylates or methacrylates, for example a blend of acrylate-functional polymers of different types or a blend of an acrylate-functional polymer with a non-polymeric di- or tri-acrylate, for example a urethane acrylate with tripropyleneglycol diacrylate. The viscosity of the uncured coating composition can be varied by varying the proportions of the more viscous acrylate-functional polymer and the less viscous non-polymeric multifunctional acrylate.

Alternatively, or additionally, the compound or polymer (B) can comprise a silane or siloxane containing at least one ethylenically unsaturated double bond activated by an adjacent electron-withdrawing group and at least two silicon-bonded alkoxy groups, for example a silane containing at least two alkoxy groups bonded to silicon by Si—O—C bonds and also containing at least one alpha, beta-ethylenically unsaturated carboxylate ester group. Examples of such silanes are 3-methacryloxypropyl triethoxy silane, 3-acryloxypropyl trimethoxy silane and 3-methacrylamidopropyl trimethoxy silane. Acrylate-functional siloxanes can alternatively be used.

Such an acrylate-functional silane or siloxane (B) is preferably used in conjunction with a polyamine (A). The polyamine preferably consists at least partly of an oligomeric or polymeric amine, particularly if none of (B) is present as an oligomer or polymer. The oligomeric or polymeric amine can for example be an amino-functional polyamide, polyether (for example a "Jeffamine" -trade mark), polyurea or polyurethane, containing at least two primary or secondary amine groups, most preferably as terminal groups, or a Mannich base such as that derived from ethylene diamine, formaldehyde and a substituted phenol such as an alkyl, e.g. nonyl, phenol or cardanol. The coating composition based on an acrylate-functional silane (B) can alternatively or additionally contain a non-polymeric aliphatic or cycloaliphatic amine such as 2-methyl-1,5-pentane-diamine, hexamethylene diamine, 4,4'-methylene bis(cyclohexylamine) or trimethylhexamethylene (any isomer) diamine.

The polymer (C) used in such coating compositions containing a polyamine and an acrylate-functional alkoxy silane is preferably a polyorganosiloxane (C) of any of the types described above, for example a linear or branched polydiorganosiloxane or an oligomeric alkyl silicate.

The amine group of the amino-functional compound or polymer (A) can be present in blocked form, for example as a ketimine, to extend pot life, if this is desired. Ketimines can be formed readily by the reaction of primary amino groups with a ketone, for example methyl isobutyl ketone or methyl amyl ketone.

The total silane and/or siloxane material (C) in the binder of the coating composition, including any amino-functional silane or siloxane (A), any ethylenically unsaturated silane or siloxane (B) and any alkoxy-functional polyorganosiloxane (C) which has no amino functionality or activated double bonds, is preferably at least 30% and most preferably at least 50 or 60% by weight up to 80, 90 or even 100% by weight. Where (A) is an aminoalkyl silane containing at least two alkoxy groups, it preferably forms to 40% by weight of the binder. As well as reacting with both the other ingredients of the binder to bond them into a crosslinked network, the amino-functional silane (A) ensures that the coating adheres well to substrates, particularly metal substrates such as steel. Too high a level of amine may, however, impart a susceptibility of the coating to yellowing. The polyorganosiloxane (C) preferably forms at least 25% and most preferably at least 40% by weight of the binder. Increasing amounts of polyorganosiloxane in the binder generally confer increased resistance to weathering, particularly resistance to sunlight exposure and increased hardness of the cured coating. Maximum weathering resistance (as shown by gloss retention in QUV accelerated weathering tests) is generally attained by compositions in which the polyorganosiloxane (C) is present at at least 50% up to 85 or 90% by weight of the binder.

The compound or polymer (B) generally comprises at least or 10% by weight of the binder of the coating composition up to or 40%. of the binder, or even up to 50 or 70% when an acrylate-tipped polymer (B) is used. Increasing amounts of acrylate-tipped polymer, for example an acrylate-tipped polyurethane, impart increased flexibility and toughness to the coating.

The molar ratio of amino groups of (A) to activated ethylenically unsaturated double bonds of (B) present in the coating composition can in general be in the range 1:10 to 10:1; molar ratios of at least 1:2 and up to 3:1 or 5:1 may be preferred. In general, higher levels of amine within these ranges, and particularly higher levels of an aminosilane such as an aminoalkyl trialkoxy silane, lead to harder coatings.

The coating compositions of the invention may additionally (as well as compound or polymer (A) having at least one primary or secondary amine group) contain one or more compounds or polymers containing other groups effective as electron donors in Michael or Michael-type addition reactions with activated double bonds, for example thiol (mercaptan) groups or activated -CH- groups bonded to at least two electron-withdrawing groups, particularly activated methylene groups such as acetoacetate, cyanoacetate or malonate ester groups. The coating composition can for example contain a mercaptopropyl triethoxy silane, or an acetoacetate ester of a diol or triol such as tripropyleneglycol bis(acetoacetate) or polyethyleneglycol bis(acetoacetate), or a low molecular weight acetoacetate-terminated polyester.

The coating compositions according to the invention may contain a compound which acts as a catalyst for Si—O—Si condensation. In general, the coatings are capable of curing under ambient temperature and humidity conditions to a tack-free coating in 2 to 20 hours even without such a catalyst, but a catalyst may be preferred to give a faster cure.

One example of a catalyst for Si—O—Si condensation is an alkoxytitanium compound, for example a titanium chelate compound such as a titanium bis(acetylacetonate) dialkoxide, e.g. titanium bis(acetylacetonate) diisopropoxide, a titanium bis(acetoacetate) dialkoxide, e.g. titanium bis(ethylacetoacetate) diisopropoxide, or an alkanolamine titanate, e.g. titanium bis(triethanolamine) diisopropoxide, or an alkoxy titanium compound which is not a chelate such as tetra(isopropyl) titanate or tetrabutyl titanate. Such titanium compounds containing alkoxy groups bonded to titanium may not act solely as catalysts, since the titanium alkoxide group is hydrolysable and the catalyst may become bound into the cured silane or siloxane by Si—O—Ti linkages. The presence of such titanium moieties in the cured product may be advantageous in giving even higher heat-stability. The titanium compound can for example be used at 0.1 to 5% by weight of the binder. Corresponding alkoxide compounds of zirconium or aluminium are also useful as catalysts.

An alternative catalyst is a nitrate of a polyvalent metal ion such as calcium nitrate, magnesium nitrate, aluminium nitrate, zinc nitrate or strontium nitrate. Calcium nitrate has been suggested as a catalyst for the amine curing of epoxy resins, but it has never been suggested for the curing of silane or siloxane materials. Surprisingly, we have found that calcium nitrate is an effective catalyst for the curing by Si—O—Si condensation of a silane or siloxane containing at least two alkoxy groups bonded to silicon by Si—O—C bonds, when the composition also includes an organic amine. The calcium nitrate is preferably used in its tetrahydrate form but other hydrated forms can be used. The level of calcium nitrate catalyst required is generally not more than 3% by weight of the binder, for example 0.05 to 3% by weight. Coatings cured using calcium nitrate catalyst are especially resistant to yellowing on exposure to sunlight.

Another example of a suitable catalyst is an organotin compound, for example a dialkyltin dicarboxylate such as dibutyltin dilaurate or dibutyltin diacetate. Such an organotin catalyst can for example be used at 0.05 to 3% by weight of the binder of the coating composition.

Other compounds effective as catalysts in the coating compositions of the invention are organic salts, such as carboxylates, of bismuth, for example bismuth tris (neodecanoate). Organic salts and/or chelates of other metals such as zinc, aluminium, zirconium, tin, calcium, cobalt or strontium, for example zirconium acetylacetonate, zinc acetate, zinc acetylacetonate, zinc octoate, stannous octoate, stannous oxalate, calcium acetylacetonate, calcium acetate, calcium 2-ethylhexanoate, cobalt naphthenate, calcium dodecylbenzenesulphonate or aluminium acetate, may also be effective as catalysts.

The coating compositions of the invention can contain one or more further ingredients. They can for example contain one or more pigments, for example titanium dioxide (white pigment), coloured pigments such as yellow or red iron oxide or a phthalocyanine pigment and/or one or more strengthening pigments such as micaceous iron oxide or crystalline silica and/or one or more anticorrosive pigments such as metallic zinc, zinc phosphate, wollastonite or a chromate, molybdate or phosphonate, and/or a filler pigment such as barytes, talc or calcium carbonate. The composition may contain a thickening agent such as fine-particle silica, bentonite clay, hydrogenated castor oil or a polyamide wax. The composition may also contain a plasticiser, pigment dispersant, stabiliser, flow aid or thinning solvent.

The coating composition of the invention is generally stored as a 2-pack coating in which the compound or polymer (A) containing at least one primary or secondary amine group is packaged separately from the compound or polymer (B) containing activated double bonds and preferably also separately from the alkoxy-silicon functional polymer (C). The amine (A) is reactive at ambient temperature with the activated unsaturated material (B) and also accelerates the silane condensation reaction. The components (B) and (C) can generally be stored together for long periods in the absence of amino groups. The separately packaged amine (A) is preferably mixed with the ethylenically unsaturated compound or polymer (B) and the silicon-containing polymer (C) no more than 4 hours before the coating composition is coated on the substrate. It can, for example, be mixed into the coating composition shortly before application by spray, brush or roller, or the separately packaged components can be applied by twin-feed spray.

Alternatively, the amine-functional material (A) can be pre-treated with the ethylenically unsaturated material (B) and mixed with the polymer (C) to form a single-pack composition provided that these steps are carried out in the absence of any moisture. When the single-pack composition is coated on a substrate it will be cured by atmospheric moisture leading to siloxane condensation. We have, however, found that it is difficult to form such a single-pack composition without gelation. Moreover, the coatings formed by curing the amino-functional material, acrylate-functional material and polysiloxane together are generally glossier and more scratch-resistant than coatings formed from pre-reacted materials. Such a single-pack coating composition preferably contains a water-scavenger such as triethyl orthoformate which reacts with water to form a compound harmless in the coating. Such water-scavengers can also be used to advantage in 2-pack compositions in any package containing alkoxysilane or alkoxysiloxane materials, particularly in a package which also contains pigments which can be a source of moisture.

The coating compositions of the invention generally cure at ambient temperatures, for example 5 to 30° C., and are thus suitable for application to large structures where heat-curing is impractical. The coating compositions of the invention can alternatively be cured at elevated temperatures, for example from 30 to 50° C. up to 100 or 130° C. The hydrolysis of silicon-bonded alkoxy groups depends on the presence of moisture; in almost all climates atmospheric moisture is sufficient but a controlled amount of moisture may need to be added to the coating when curing at elevated temperature or when curing in very low humidity (desert) locations. The water is preferably packaged separate from any compound or polymer containing silicon-bonded alkoxy groups.

The coating compositions of the invention can in general be used as finish coatings and/or primer coatings. Coating compositions containing a relatively high proportion of polysiloxane (C), for example containing polysiloxane (C) plus alkoxysilane (A) or (B) at more than 60 or 70% by weight of the binder, have high gloss which is retained remarkably well on weathering and UV exposure They are particularly suitable for coating substrates which are exposed to the weather, e.g. sunlight, for long periods before recoating. The highest levels of gloss may be achieved if the coating composition includes an organic solvent (thinner) such as xylene, although use of solvent is not generally necessary in the coating compositions of the invention, which can be 100% solids coatings having very low measured volatile organic content. The coating composition can contain an alcohol, e.g. ethanol or butanol, preferably packaged with the alkoxysilyl-functional component, to extend pot life and control initial speed of curing. A finish coating according to the invention can be applied over various primer coatings, for example inorganic zinc silicate or organic zinc-rich oiliate primers and organic, e.g. epoxy resin, primers containing zinc metal, corrosion-inhibiting, metal flake or barrier pigments. The coating composition of the invention has particularly good adhesion to inorganic zinc silicate coatings without needing an intermediate tie coat or mist coat. A finish coating composition of the invention can also be applied directly over aluminium or zinc "metal spray" coatings, whereby it acts as a sealer as well as a top coat, or over galvanised steel, stainless steel, alumnium, or plastics surfaces such as glass fibre reinforced polyester or a polyester gel coat. The coating composition can for example be used as a finish coating on buildings, steel structures, automobiles, aircraft and other vehicles and general industrial machinery and fitments. The finish coating can be pigmented or can be a clear (non-pigmented) coat, particularly on cars or yachts. The coating composition can be applied direct to prepared carbon steel as a primer/finish.

The coating composition of the invention can alternatively be used as a protective primer coating, particularly on steel surfaces, for example bridges, pipelines, industrial plant or buildings, oil and gas installations or ships. For this use it is generally pigmented with anticorrosive pigments. It may for example be pigmented with zinc dust; coatings according to the invention have similar anticorrosive performance to known zinc silicate coatings but are less liable to mud-cracking and can be readily overcoated, particularly with a polysiloxane finish, for example a finish coat according to the present invention. Primer coating compositions according to the invention can be used as maintenance and repair coatings on less than perfect surfaces such as aged blasted steel or "ginger" (steel which has been blasted and has started to rust in small spots), hand-prepared weathered steel and aged coatings.

As well as outstanding resistance to UV weathering, the coatings produced from the compositions of the invention have good flexibility and adhesion to most surfaces and have higher heat resistance (up to 150° C. and usually up to 200° C.) than most organic coatings.

The invention is illustrated by the following Examples:

EXAMPLE 1

49.13 g titanium dioxide pigment was dispersed in 18.9 g of an alkoxy-tipped silicone in the presence of 0.35 g of pigment dispersant (EFKA 54 from Stort Chemicals), 0.69 g of thickening agent (bentone) and 0.30 g of defoamer (Byk-70 from Byk-Chemie) under moisture-free conditions. The alkoxy-tipped silicone was a methyl phenyl polysiloxane (3074 from Dow Corning) of molecular weight about 1300, believed to be tipped with units having methoxy bonded to silicon.

The resulting pigment dispersion was let down successively with a further 9.32 g of the above alkoxy-tipped silicone, 12.43 g of tripropyleneglycol diacrylate (Laromer TPGDA from BASF) and 0.64 g of Tilcom KE2 (titanium bis(ethyl acetoacetate) diisopropoxide from Tioxide Specialities). The composition was filled into a can and sealed to exclude moisture.

The above base composition was cured with 8.23 g of 3-aminopropyl triethoxysilane (A1100 from Osi Specialities) which was mixed into the base composition just before spraying. The mixture was sprayed onto a steel panel at a dry film thickness of 100 microns. The coating was allowed to cure under ambient conditions (23° C. and 65% relative humidity). The coating was touch dry after 3 hours, and after hours it had formed a hard, tough film.

EXAMPLES 2 to 7

Two-pack coating compositions were prepared as described in Example 1 from the following components (figures in per cent by weight):

| Pigment Dispersion | 2 | 3 | 4 | 5 | 6 | 7 |
|---|---|---|---|---|---|---|
| Titanium Dioxide | 49.60 | 50.51 | 40.97 | 39.68 | 40.59 | 50.00 |
| SY550 methyl phenyl silicone containing silicon-bonded alkoxy groups (from Wacker) | 19.79 | — | — | — | — | — |
| 3074 alkoxy-tipped silico | — | 19.81 | 25.14 | 19.77 | — | 19.80 |
| MSE-100 methyl ether of | — | — | — | — | 28.75 | — |

| Pigment Dispersion | 2 | 3 | 4 | 5 | 6 | 7 |
|---|---|---|---|---|---|---|
| oligomeric methyl silicates (from Wacker) | | | | | | |
| EFKA dispersant | 0.35 | 0.36 | 0.28 | 0.27 | 0.28 | 0.36 |
| Bentone thickener | 0.71 | 0.72 | 0.57 | 0.55 | 0.57 | 0.72 |
| Byk-70 Defoamer | 0.29 | 0.30 | 0.28 | 0.26 | 0.27 | 0.30 |
| Further Ingredients of Coating Composition | | | | | | |
| SY550 alkoxy-tipped silicone | 9.89 | — | — | — | — | — |
| 3074 alkoxy-tipped silicone | — | 9.90 | 12.22 | 9.87 | — | 9.90 |
| MSE-100 methyl oligomeric silicate | — | — | — | — | 14.11 | — |
| Laromer 8794 Melamine Acrylate resin (from BASF) | 10.42 | — | — | — | — | — |
| Propoxylated glycerol triacrylate (Crodamer UVM-35 from Croda) | — | 10.97 | — | — | — | 10.97 |
| Setacure 576 Urethane acrylate resin (from Akros) | — | — | 8.31 | — | — | — |
| Actilane 210 TP30 Urethane acrylate resin (from Akros) | — | — | — | 7.65 | — | — |
| Tripropylene glycol diacrylate | — | — | — | 7.65 | 7.65 | — |
| Dibutyltin dilaurate | 0.50 | — | — | — | — | — |
| Tilcom AT21 alkanolamine titanate | — | 0.50 | — | — | — | — |
| Calcium nitrate tetrahydrate | — | — | 0.70 | — | 0.50 | — |
| Bismuth tris (neodecanoate) | — | — | — | — | — | 1.00 |
| Curing Agent (Packaged Separately) | | | | | | |
| 3-aminopropyltriethoxysilane | 8.45 | 6.93 | 11.53 | 14.30 | 7.28 | 6.95 |

Each of the coatings was sprayed and allowed to cure as described in Example 1. Each formed a hard tough film. The coating of Example 5 (which contained no catalyst) was somewhat slower to cure but still formed a hard tough film within 24 hours.

What is claimed is:

1. A curable coating composition having a binder comprising a compound or polymer (A) containing at least one primary or secondary amine group and a compound or polymer (B) containing at least one ethylenically unsaturated double bond activated by an adjacent electron-withdrawing group, wherein the compound or polymer (B) contains at least two activated ethylenically unsaturated double bonds if the compound or polymer (A) contains only one primary or secondary amine group, wherein either (A) or (B) contains at least one silicon-bonded alkoxy group in its molecule and the composition additionally contains a polymer (C) containing at least two silicon-bonded alkoxy groups.

2. A coating composition according to claim 1, wherein the ethylenically unsaturated double bond is present in an alpha, beta-ethylenically unsaturated carboxylate ester group.

3. A coating composition according to claim 1, wherein the compound or polymer (B) is an epoxy acrylate, polyether acrylate, polyester acrylate, melamine resin acrylate or urethane acrylate containing at least two acrylate or methacrylate ester groups.

4. A coating composition according to claim 1, wherein the compound or polymer (A) is an aminoalkyl silane containing at least two alkoxy groups bonded to silicon.

5. A coating composition according to claim 1, wherein (A) is a polyamine and (B) is a silane containing at least two alkoxy groups bonded to silicon by Si—O—C bonds and further at least one alpha, beta-ethylenically unsaturated double bond.

6. A coating composition according to claim 1, wherein the polymer (C) is a polyorganosiloxane.

7. A coating composition according to claim 6, wherein the polyorganosiloxane (C) contains on average 4 to 25 silicon atoms.

8. A coating composition according to claim 6, wherein the polyorganosiloxane is a methyl phenyl polysiloxane.

9. A coating composition according to claim 6, wherein the polymer (C) is an oligomeric alkyl silicate.

10. A coating composition according to claim 6, wherein the polyorganosiloxane (C) forms 40 to 85% by weight of the binder.

11. A coating composition according to claim 1, wherein the composition contains a catalyst which is a nitrate of a polyvalent metal ion.

12. A coating composition according to claim 11, wherein the nitrate is calcium nitrate.

13. A coating composition according to claim 1, wherein the composition contains a catalyst which is an alkoxytitanium compound.

14. A coating composition according to claim 13, wherein the alkoxy titanium compound is a titanium bis(acetylacetonate) dialkoxide or titanium bis(acetoacetate) dialkoxide or an alkanolamine titanate.

15. A coating composition according to claim 1, wherein the composition contains an organotin compound as catalyst.

16. A coating composition according to claim 1, wherein the composition contains a bismuth carboxylate as catalyst.

17. A process for coating a substrate, wherein a coating composition according to claim 1, is coated on the substrate and allowed to cure at ambient temperature and moisture both by Michael-type addition reaction of the amine group of (A) with the activated ethylenically unsaturated double bond of (B) and by hydrolysis and condensation of the Si—O—C bonds of (C) and whichever of (A) and (B) contains a silicon-bonded alkoxy group in its molecule.

18. A process according to claim 17, wherein the amine (A) is packaged separately and is then mixed with the ethylenically unsaturated compound or polymer (B) and the silicon-containing polymer (C) no more than 4 hours before the coating composition is coated on the substrate.

19. A curable coating composition comprising a polyorganosiloxane (C) containing at least two alkoxy groups bonded to silicon and an aminoalkyl silane (A) containing at least one alkoxy group bonded to silicon, and a compound or polymer (B) containing at least two ethylenically unsaturated double bonds each activated by an adjacent electron-withdrawing group, wherein the coating is capable of curing at ambient temperature and humidity both by hydrolysis and condensation of the Si—O—C bonds of the polyorganosiloxane (C) and of the aminoalkyl silane (A) and by Michael-type addition reaction of the amine group of the aminoalkyl silane (A) with the activated ethylenically unsaturated double bonds of (B).

20. A coating composition according to claim to 19, wherein the composition contains a catalyst which is a nitrate of a polyvalent metal ion.

21. A coating composition according to claim 19, wherein the composition contains a catalyst which is an alkoxytitanium compound.

22. A coating composition according to claim 19, wherein the composition contains an organotin compound as catalyst.

23. A coating composition according to claim 19, wherein the composition contains a bismuth carboxylate as catalyst.

24. A process for coating a substrate, wherein a coating composition according to claim 19, is coated on the substrate and allowed to cure at ambient temperature and moisture both by Michael-type addition reaction of the amine group of (A) with the activated ethylenically unsaturated double bond of (B) and by hydrolysis and condensation of the Si—O—C bonds of (C) and whichever of (A) and (B) contains a silicon-bonded alkoxy group in its molecule.

25. A coating composition according to claim 20, wherein the nitrate is calcium nitrate.

26. A coating composition according to claim 21, wherein the alkoxy titanium compound is a titanium bis(acetylacetonate) dialkoxide or titanium bis(acetoacetate) dialkoxide or an alkanolamine titanate.

* * * * *